United States Patent [19]

Martinek

[11] Patent Number: 4,604,085
[45] Date of Patent: Aug. 5, 1986

[54] SAUSAGE CASING AUTOMATIC CLOSING METHOD

[75] Inventor: Thomas W. Martinek, Covington, Ind.

[73] Assignee: Teepak, Inc., Oak Brook, Ill.

[21] Appl. No.: 587,347

[22] Filed: May 4, 1984

Related U.S. Application Data

[63] Continuation of Ser. No. 94,270, Nov. 14, 1979, Pat. No. 4,475,895.

[51] Int. Cl.[4] .............................................. A22C 13/00
[52] U.S. Cl. ........................................ 493/259; 17/34; 493/308
[58] Field of Search ............... 17/34, 33, 24; 198/486, 198/694, 653; 414/753, 751, 750, 226, 225; 493/259, 255, 308, 244, 916; 53/581, 575

[56] References Cited

U.S. PATENT DOCUMENTS

| | | | |
|---|---|---|---|
| 1,701,712 | 2/1929 | Allen et al. | 17/34 |
| 2,010,626 | 8/1935 | Dietrich | 53/581 X |
| 2,479,695 | 8/1949 | Morin | 53/581 X |
| 3,012,604 | 12/1961 | Zieg | 493/463 X |
| 3,178,040 | 4/1965 | Nelson | 414/753 X |
| 3,184,786 | 5/1965 | Ives | 53/581 X |
| 3,522,838 | 8/1970 | Ott | 414/753 X |
| 3,570,045 | 3/1971 | Matecki | 17/34 |
| 3,731,821 | 5/1973 | Wallis | 414/753 |
| 4,075,938 | 2/1978 | Martinek | 17/34 |
| 4,165,808 | 8/1979 | Stumpf | 414/753 X |

FOREIGN PATENT DOCUMENTS 603402 12/1977 Switzerland .................. 53/581

Primary Examiner—James F. Coan
Attorney, Agent, or Firm—Howard M. Ellis; Michael L. Dunn

[57] ABSTRACT

This relates to apparatus for effecting the closing of one end of a shirred casing strand. A strand is to be automatically presented to a previously developed closer in alignment therewith and under a preselected pressure. A transfer device is provided for receiving a doffed strand, transferring the strand transversely and then moving the strand longitudinally so that an end of the strand engages the closer. A gripping mechanism is provided which includes a pair of jaws having opposing clamp elements of a generally V-shape or angle cross section. The two jaws are simultaneously movable either together or apart and are urged apart by compression springs. A fluid cylinder actuated linkage urges the jaws towards closed positions. By varying the closing force, the clamp members can be first moved to a preset spacing providing a receptacle into which a doffed strand of a predetermined size may be readily slid. Then by increasing the the pressure of the cylinder, the strand may be sufficiently tightly gripped to prevent relative movement during the closing operation. The closer members are separated to release a closed strand at the end of the closing operation. By varying the pressure to the cylinder in the receptacle forming stage of the clamping members, the size of the receptacle may be adjusted in accordance with variations in size of casing strands to be handled. A control system for the automatic operation of the transfer device in conjunction with the closing device is provided.

10 Claims, 14 Drawing Figures

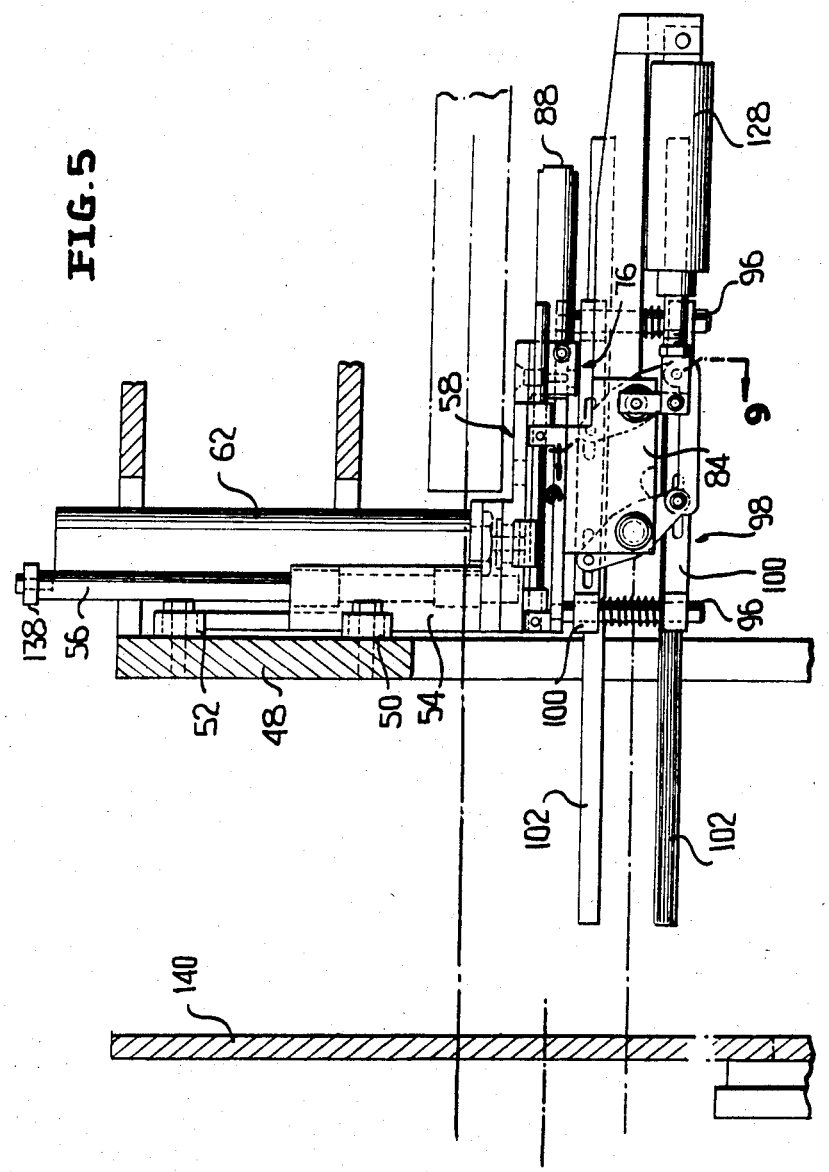

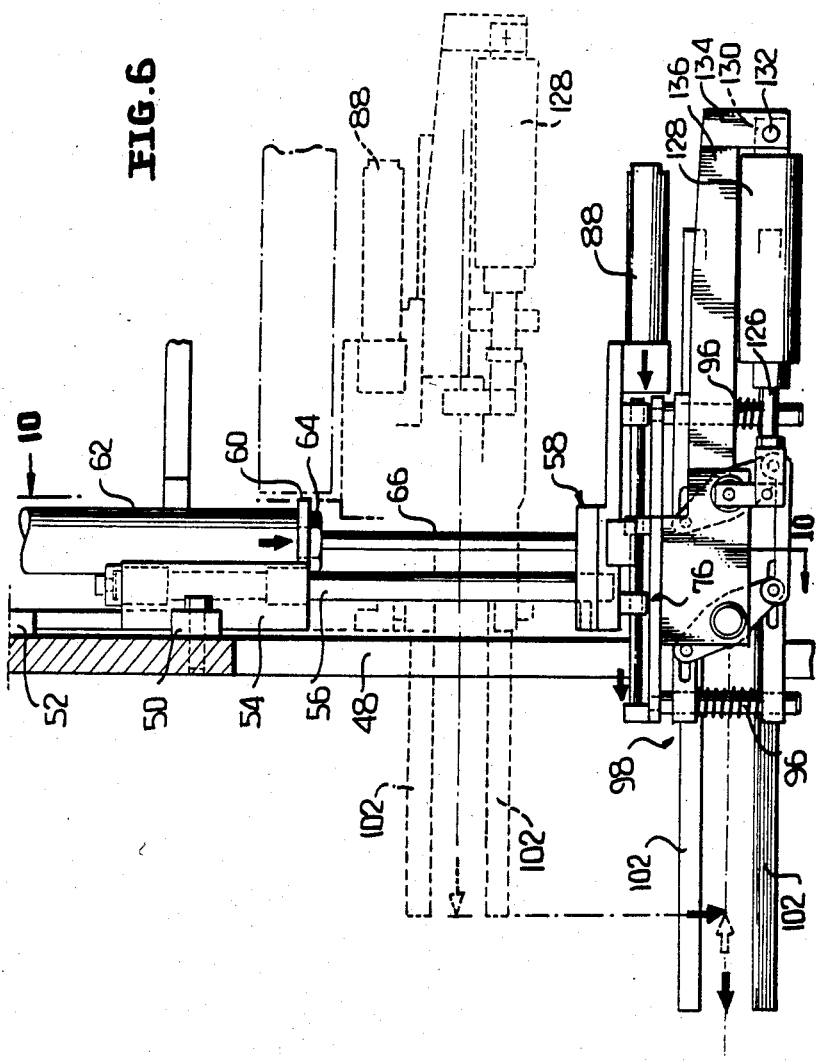

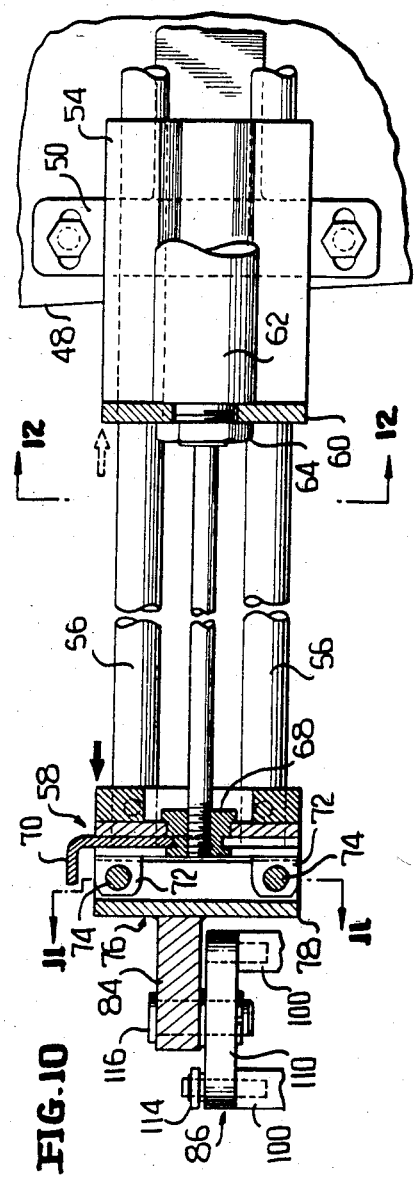

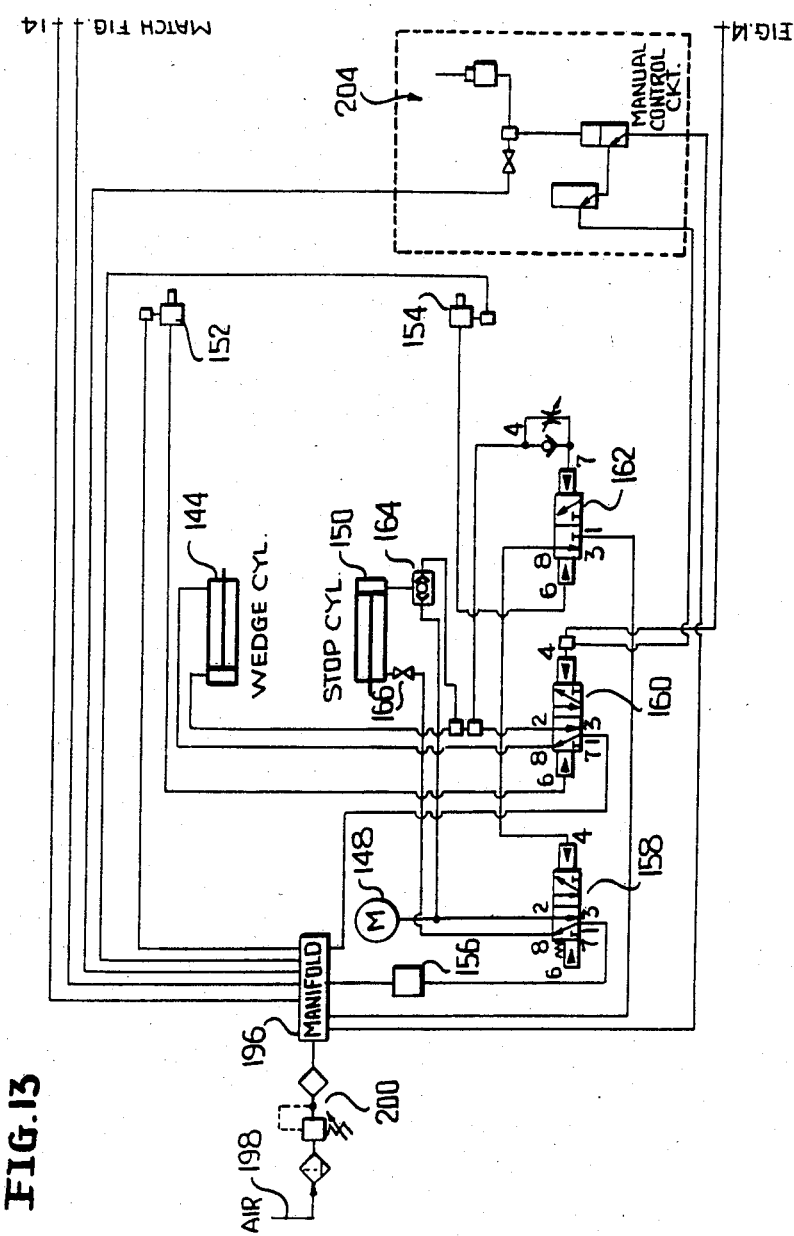

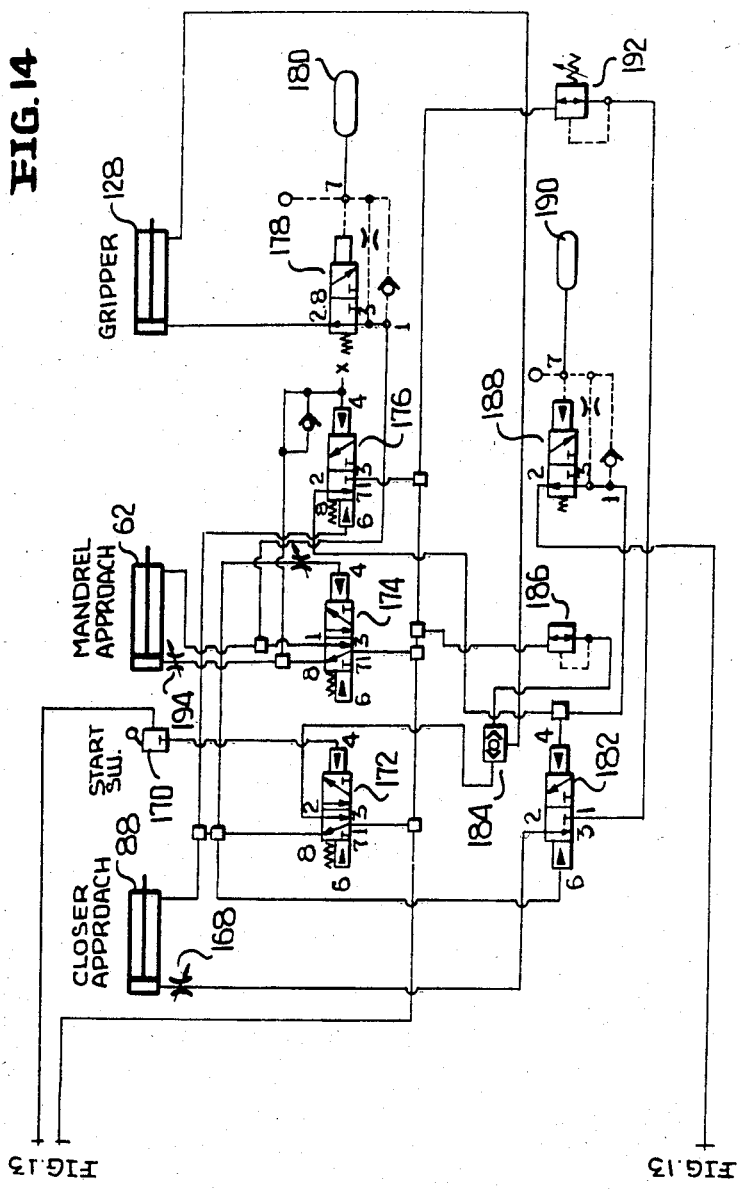

SAUSAGE CASING AUTOMATIC CLOSING METHOD

This is a continuation of application Ser. No. 94,270, filed Nov. 14, 1979, now U.S. Pat. No. 4,475,895.

This invention relates to the closing of one end of a stick of shirred casing used in the manufacture of "skinless" hot dogs.

There has previously been developed a closing head for closing an end of a hollow shirred casing stick which is the subject of prior U.S. Pat. No. 4,075,938, granted Feb. 28, 1978. This invention has to do with the provision of a stick or strand handler for automatically positioning a strand relative to the closing mechanism of U.S. Pat. No. 4,075,938 under a controlled pressure condition whereby end closure may be consistent throughout plural casing sticks or strands.

A primary feature of this invention is the formation of a jaw arrangement for receiving a shirred casing strand or stick, which jaw arrangement is particularly constructed for normally defining a receptacle into which a shirred casing stick or strand may be readily inserted in an endwise direction as it is doffed from its carrier mandrel, and thereafter the jaws are closable under a controlled pressure condition for firmly gripping the casing strand for directing one end of the casing strand against the closing head.

Another feature of the jaw assembly is the resilient separation of the jaws after an end of a casing strand has been closed to the extent that the strand is released from the jaws in a transverse direction.

The several positions of the jaws is effected by resiliently urging the jaws apart by spring elements which are compressible under load. The spring elements, when the jaws are not loaded, will urge the jaw elements widely apart for receiving casing strands of different diameters. Then, by applying a selected pressure urging the jaws together against the resistance of the spring elements, the jaws may be partially moved together to form the aforementioned receptacle for the specified casing strand diameter. The exertion of a still greater, but controlled, pressure on the jaws will cause the jaws to move to a closing position wherein the jaws grip a casing strand at a preselected pressure. This may be accomplished using a single fluid cylinder and supplying a fluid thereto at different pressures.

Another feature of the invention is the movement of the jaw assembly longitudinally after a casing strand is gripped thereby so that one end of the casing strand is presented to a closing head under controlled pressure conditions which are repeatable. Further, a fluid cylinder may be utilized for this purpose and the flow of fluid under pressure to the cylinder may be metered so as to control the rate at which the strand may be presented to the closing head.

Finally, the jaw assembly may be carried for movement in a transverse direction for first aligning the jaws with a mandrel from which a shirred casing is to be doffed, and after the casing strand is received within the jaw assembly, the jaw assembly may be shifted transversely of the axis of the jaw assembly to align the casing strand with the closing head.

A further feature of the invention is the provision of a fluid control circuit for automatically actuating the various fluid cylinders of the strand handling device as well as the various components of the closing head in the required timed sequence in response to the actuation of a control device for the casing shirring machine.

With the above and other objects in view that will hereinafter appear, the nature of the invention will be more clearly undersgood by reference to the following detailed description, the appended claims, and the several views illustrated in the accompanying drawings.

IN THE DRAWINGS

FIG. 5 is a fragmentary top plan view taken generally along the line 5—5 of FIG. 4, and shows further the details of the transfer mechanism.

FIG. 6 is a top plan view similar to FIG. 5, and shows the jaw assembly moved both transversely and longitudinally for positioning the jaw assembly, and a casing strand carried thereby relative to the closing head.

FIG. 10 is a transverse vertical sectional view taken generally along the line 10—10 of FIG. 6, and shows the mounting of the jaw assembly for transverse shifting movement between a strand receiving position and a strand closing position.

FIG. 11 is a fragmentary longitudinal sectional view showing the mounting of the jaw assembly for longitudinal movement to present a strand to the closing head.

FIG. 12 is a fragmentary longitudinal vertical sectional view taken generally along the line 12—12 of FIG. 10, and shows the mounting of the transfer cylinder.

FIGS. 13 and 14 combined show a fluid system circuit for operating the transfer device and the closing head.

Figure 1:
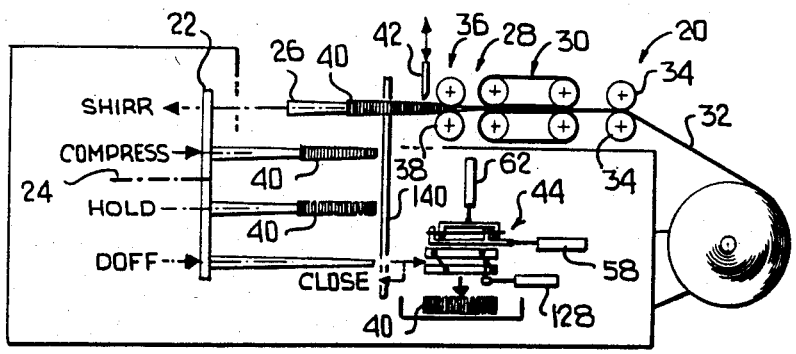
FIG. 1 is a schematic elevational view of a casing shirring machine incorporating the closing mechanism of this invention.
Figure 2:
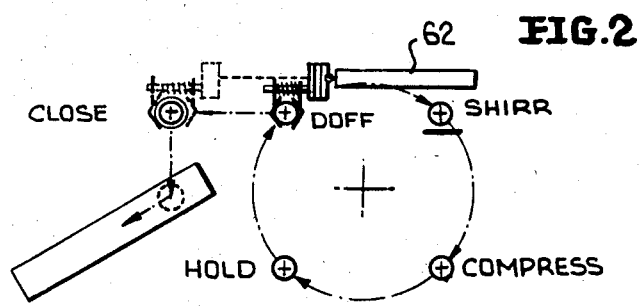
FIG. 2 is a transverse schematic view showing the relationship of the casing strand closing apparatus with respect to the shirring machine mandrel stations.

Although the closing apparatus of this invention may be used with various types of shirring machines, in order that the invention may be clearly understood there is illustrated the invention in conjunction with one type of existing shirring machine which is generally identified by the numeral 20. Very broadly, the shirring machine 20 includes a turret 22 which is indexable about a horizontal axis 24 and carries a plurality of circumferentially spaced mandrels 26. The mandrels 26 are sequentially aligned with a shirring mechanism, generally identified by the numeral 28. The shirring mechanism includes a casing feed belt arrangement 30 which controls the movement of a casing 32 through a pair of guide rollers 34 to a shirring head 36 which includes a plurality of shirring wheels 38. The casing 32 is progressively shirred and moved onto the active mandrel 26 until the desired length of shirred casing stick or strand 40 has been formed. The casing is then cut off by way of a cutoff device 42. At this time shirring is discontinued and the turret 22 is indexed to bring a new empty mandrel 26 into alignment with the shirring mechanism 28. While the next strand is being shirred onto the new mandrel, the previously shirred casing is axially compressed at a second station as schematically indicated in FIGS. 1 and 2.

In the illustrated shirring machine the third station is a holding station and at the fourth station the compressed shirred casing strand is doffed from the mandrel so that the empty mandrel is available for presentation to the shirring station.

In the past, the doffed casings were manually presented to a closing head for closing one end thereof. This invention relates to the provision of an automatic transfer mechanism, generally identified by the numeral 44, which will receive the doffed casing strand or stick, firmly grip the strand, transfer the strand transversely into alignment with a closing head, generally identified by the numeral 46 and illustrated in FIGS. 3 and 4, and then longitudinally move the transferred strand into controlled pressure engagement with the closing head to effect a repeatable closing of the strand one end.

Figure 3:
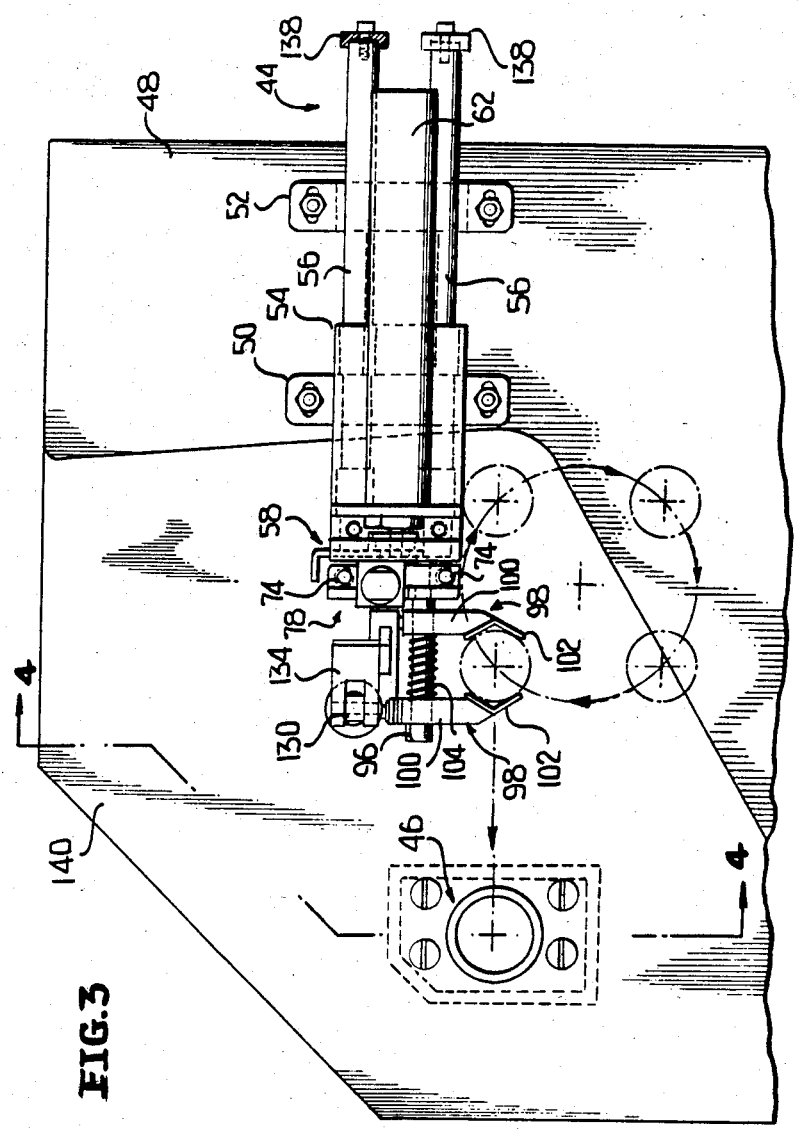
FIG. 3 is an enlarged end elevational view of the transfer mechanism.

Referring now to FIGS. 3, 5 and 6 in particular, it will be seen that the shirring machine 20 has a frame plate 48 on which the transfer mechanism 44 is mounted. Most specifically, the plate has secured thereon a pair of mounting brackets 50, 52 which, in turn, mount a combined guide and support member 54. The combined guide and support member 54 has guideways therethrough on which a pair of parallel support rods 56 are mounted for horizontal transverse movement. The rods 56 carry a first carrier 58.

The combined guide and support member 54 has a mounting flange 60 to which there is secured the foreward end of a mandrel approach fluid cylinder 62. The cylinder 62 is secured in place by way of a nut 64 and has a piston rod 66 which is connected to the carrier 58 by way of a nut 68 and a lock member 70 as is best shown in FIG. 10. The fluid cylinder 62 is thus operable to reciprocate the carrier 58 and the rods 56 as a unit transversely of the shirring machine 20.

The carrier 58 is elongated transversely of the rods 56, as shown in FIG. 6, and has projecting from the face thereof opposite from the rods 56 two sets of guide ears 72 as is best shown in FIGS. 10 and 11. The guide ears 72 are arranged in vertically spaced, longitudinally aligned sets and have slideably mounted therein a pair of combined guide and support rods 74. The rods 74, in turn, mount a second carrier 76. It is to be noted that the carrier 76 is basically in the form of a longitudinally extending vertical plate 78 which has extending from the rear surface thereof at opposite ends a pair of flanges 80 in which the rods 74 are fixedly secured by means of set screws 82. In this manner the carrier 76 is locked to the rods 74 for movement therewith.

A mounting plate 84, which is horizontally disposed and longitudinally extending, projects from the opposite face of the plate 78 and has mounted thereon a gripper assembly 86 which will be described in detail hereinafter.

The carrier 58 has mounted thereon a closer approach fluid cylinder 88 as is best shown in FIG. 6. The cylinder 88 is provided at the foreward end thereof with a mounting block 90 carrying fasteners 92, as is best shown in FIG. 11. The cylinder 88 has a projecting piston rod 94 which is threaded into one of the flanges 80 in the manner also best shown in FIG. 11. The cylinder 88 serves to move the carrier 76 longitudinally of the shirring machine 20 for moving a strand carried by the gripper assembly 86 into engagement with the closer head 46 and will be described in more detail hereinafter.

Figure 7:
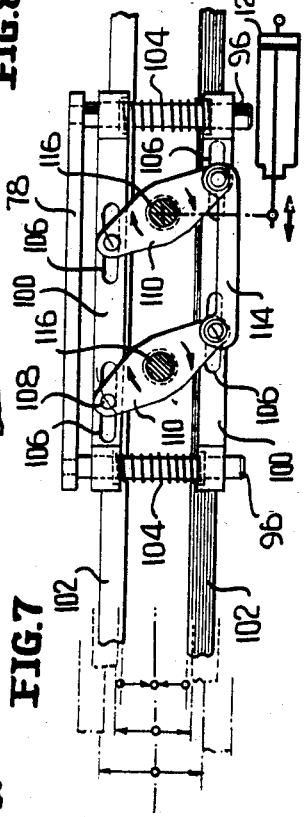
FIG. 7 is a fragmentary schematic plan view with parts in section of the jaw assembly, showing the various positions of the jaws thereof, the view being taken generally along the line 7—7 of FIG. 4.

The gripper assembly 86 includes a pair of transversely extending support pins or rods 96 which extend from the front face of the plate 78 as is generally shown in FIGS. 3 and 7. Mounted on the pins 76 for transverse movement is a pair of jaws 98. Each jaw 98 includes a mounting bar 100 which is directly mounted on the rods 96 and each bar carries an angle shape clamp member 102 as is best shown in FIG. 3. It is to be noted that the clamp members 102 open towards one another and because of the angle shape configuration are readily adaptable to engage strands of different diameters.

The bars 100 are freely mounted on the pins 96 for transverse movement and are resiliently urged apart by a compression spring 104 carried by each pin 96 between the adjacent bars 100. It is to be understood that the springs 104 are to be specially selected for a purpose to be described hereinafter and are operable to open the jaws 98 to full open position.

Figure 9:
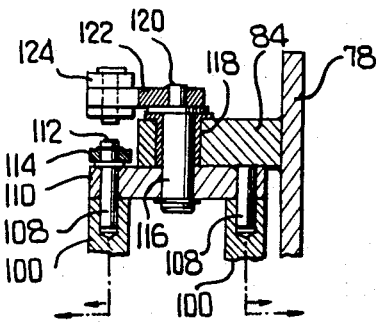
FIG. 9 is an enlarged fragmentary vertical sectional view taken generally along the line 9—9 of FIG. 5, and shows the means for actuating the jaws.

Each of the bars 100 is provided in its upper surface with a pair of elongated slots 106 as is best shown in FIG. 7. The slots in the two bars are longitudinally offset and receive therein depending pins 108 carried by opposite end portions of double lever members 110. As is best shown in FIG. 9, one set of pins 108 merely extends downwardly into one of the bars 100, while the opposite set of pins 108 have upper extensions 112 and are connected together by a link 114. The link 114 thus synchronizes the movement of the levers 110.

Each of the levers 110, as is also best shown in FIG. 9, underlies the support plate 84 and is carried by a pin 116 which is journalled within a bushing 118 in the plate 84. It is to be understood that the pin 116 is drivingly connected with at least one of the levers 110 for pivoting in unison therewith. That one pin 116, as is best shown in FIG. 9, has an upper extension 120 to which there is secured a crank arm 122 for rotation with the pin 116. The crank arm 122, in turn, is engaged by a fitting 124 carried by an end of a piston rod 126 of a gripper fluid cylinder 128. It is to be noted from FIG. 6 that the cylinder 128 has a rear mounting flange 130 which is connected by a vertical pivot pin 132 to a support flange 134 carried by a longitudinally extending mounting plate 136 which is part of the carrier 76.

Reference is now made to FIGS. 8a, b and c. In FIG. 8b, it will be seen that the fluid cylinder 128 has been actuated by the introduction of fluid so as to urge the clamp members 102 towards one another against the combination of the springs 98. By properly coordinating the strength of the springs 98 and the force exerted by the cylinder 128, there can be an automatic bringing together of the clamping members 102 to a preselected spacing which is larger than the diameter of the intended casing strand to be closed. Thus, when the gripper assembly 86 is aligned with the mandrel 26 from which the compressed shirred casing strand 40 is to be doffed, the strand 40 will freely slide longitudinally into the receptacle defined by the clamp members 102.

Thereafter, when the fluid pressure to the cylinder 128 is increased, as will be described in detail hereinafter, the clamp members 102 will be further urged together as shown in FIG. 8a and will grip the casing strand 40 therebetween. It is to be understood that the gripping pressure of the clamp members 102 on the casing strand will be controlled by the fluid pressure directed to the cylinder 120 and, of course, by a proper selection of cylinder.

After the strand 40 has been gripped, the mandrel approach cylinder 62 is actuated so as to shift the gripper assembly 86 transversely of the shirring machine 20 and into alignment with the closer head 46. This position is assured by engagement of stops 148 carried by the right ends of the rods 56 with the right end of the combined guide and support 54. It is also to be noted at this time that the gripper assembly 86 is aligned with the mandrel from which a strand is to be doffed by the engagement of the carrier 58 with the left end of the combined guide and support 54 as viewed in FIG. 3.

After the strand has been aligned with the closer head 46, the gripper assembly 86 is moved longitudinally to the left, as viewed in FIG. 1, to bring the left end of the strand 40 into engagement with the closer head 46 at a controlled rate and at a controlled pressure so that the closer head may function uniformly to close the end of the strand 40 in the manner described in U.S. Pat. No. 4,075,938.

Figure 4:
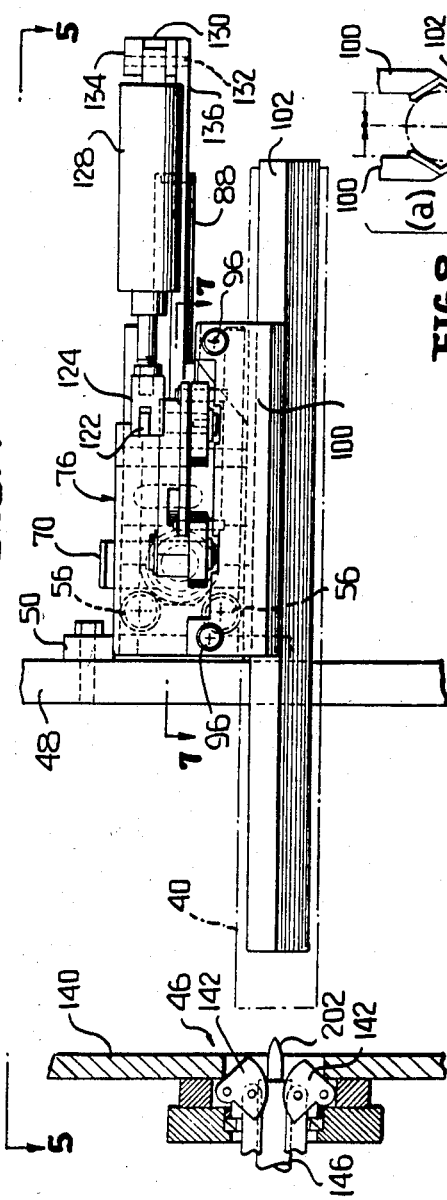
FIG. 4 is a front elevational view of the transfer mechanism, and shows it in relation to a closing head, with the closing head being in section generally along the line 4—4 of FIG. 3.

Referring now to FIG. 4, it will be seen that the closer head 46, which is the subject of U.S. Pat. No. 4,075,938, is mounted generally to the left of a frame plate 140 and includes, among other features, a pair of pivotally mounted wedges 142 which are actuated by a fluid cylinder 144 (FIG. 13) identified as a wedge cylinder. The closer head also includes a rotatable mandrel 146 which is driven by an air motor 148 (FIG. 13).

It is to be understood that in accordance with the disclosure of U.S. Pat. No. 4,075,938 there is a stop mechanism (not shown) which is controlled by a fluid cylinder 150 illustrated in FIG. 13 and identified as a stop cylinder.

In order best to understand the control system, specific control elements will now be identified. In FIG. 13, there is illustrated a reset closure mode valve 152 and a reset arbor mode delay valve 154. There is also illustrated a motor-stop cylinder-lubricator 156. There are control valves including an arbor motor-stop cylinder valve 158, a closer mode valve 160 and an arbor mode delay valve 162. Also of consequence in FIG. 13 is a stop cylinder shuttle valve 164 and a closer stop cylinder needle valve 166.

With reference to FIG. 14, there is associated with the closer approach cylinder 88 a closer approach cylinder needle valve 168. A plurality of control valves are provided including a system mode pilot switch 170, a system mode valve 172, a mandrel approach valve 174, a mandrel approach delay valve 176, a drop strand pulse valve 178, a drop strand pulse delay volume 180, a closer approach cylinder valve 182, a gripper cylinder shuttle valve 184, a grip pressure regulator 186, a start closer pulse valve 188, a pulse valve delay volume 190 and a closer approach cylinder pressure regulator 192. The mandrel approach cylinder is provided with an adjustable needle valve 194.

Referring once again to FIG. 13, it will be seen that the system includes a manifold 196 to which air is supplied from an air source 198 through a pressure regulator 200 so that air is directed into the manifold at house pressure.

The operation of the control system is as follows.

The shirring machine 20 is provided with control cams including a control cam for controlling the operation of the system mode pilot switch 170 to an on position. Thus the switch 170 functions as a start switch.

The movement of the switch 170 to the on position causes pressure at port 4 at the system mode valve 172 which causes the valve 172 to shift. The shifting of the valve 172 causes (a) house pressure at port 7 of the gripper cylinder shuttle valve 184 and at port 4 of the closer approach cylinder valve 182, and (b) exhausting of pressure at port 6 of the closer approach cylinder valve 182, retract side of closer approach cylinder 88, port 6 of the closer approach delay valve 176 and port 4 of the mandrel approach valve 174.

This, in turn, results in house pressure on the retract side of the gripper cylinder 128 causing a strand 40 to be clamped tightly between the clamp members 102. The exhausting of pressure at port 6 of the valve 182 allows the closer approach cylinder valve 182 to be shifted. Exhausting of pressure at the retract side of the closer approach cylinder 88 allows the cylinder to be advanced. Exhausting of the pressure at port 6 of the valve 176 allows the valve 176 to be shifted. Exhausting of port 4 of the valve 174 allows the spring actuator of that valve to shift the valve.

The exhausting of pressure at port 4 of the valve 174 also increases pressure at the mandrel approach cylinder 62 on the advance side and the port 4 of the closer approach delay valve 176.

Pressure on the advance side of the cylinder 62 causes the tightly clamped strand 40 to be shifted from alignment with the mandrel from which it is doffed to alignment with the closer head 46 while the application of pressure at port 4 of the valve 176, after a preset delay to allow completion of the shifting of the strand, causes the valve 176 to shift.

The shifting of the valve 176 causes pressure at port 4 of the closer approach cylinder valve 182 and port 1 of the start closure pulse valve 188 with the pressure at port 4 of the valve 182 causing the valve 182 to shift and to cause regulated pressure at the advance side of the closer approach cylinder 88. The closer approach cylinder 88 then causes the strand 40 to move into the closer head 46.

Pressure at port 1 of the valve 188 results in a pulse of air to port 4 of the closer mode valve 160 which results in house pressure at the advance side of the wedge cylinder 144, at the stop cylinder shuttle valve 164 and port 4 of the arbor mode delay valve 162. The wedge cylinder 144, being actuated, causes the wedges 142 to project from the face of the closer head.

Pressure at the stop cylinder shuttle valve 162 causes the stop cylinder 150 to advance, preventing worm gears (not shown) of the closer head 46 from turning when the arbor 146 turns. Pressure at port 4 of the valve 162 causes shifting of the valve 162 after a delay, and this, in turn, results in pressure at port 4 of the arbor mode stop cylinder valve 158. Pressure at port 4 of the valve 158 causes pressure to the arbor mode 148 using lubricated air from the lubricator 156 and pressure with lubricated air to the stop cylinder shuttle valve 164. The operation of the motor 148 causes the casing from the strand 40 to be picked up by the wedges 142 and wound on the point 202 of the arbor 146 as it is advanced because the aforementioned worm gears cannot turn. Pressure to the valve 164 serves to keep the stop cylinder 150 engaging the worm gears.

As the arbor shaft 146 advances to the right, a follower of the shaft (not shown) depresses the reset closer mode valve 152 which causes a pressure pulse at port 6 of the closure mode valve 160 which results in the shifting of the valve 160 causing pressure at the retract side of the wedge cylinder 144, exhaust of pressure at the advance side of the wedge cylinder 144, exhaust of pressure at one side of the stop cylinder shuttle valve 164, and exhaust of pressure at port 4 of the arbor motor delay valve 162.

The reverse movement of the wedge cylinder 144 causes the wedges 142 to retract flush with the face of the closer head 46. Exhaust of pressure on one side of the valve 164 allows pressure to advance the stop cylinder 150 to be interrupted when the other side of the cylinder 150 is exhausted. Exhaust of pressure at port 4 of the valve 162 allows the arbor motor delay valve 162 to be shifted by pilot pressure at port 6.

The aforementioned arbor shaft follower depresses reset arbor delay valve 154 which results in pressure at port 6 of the arbor delay valve 162 which, in turn, causes the valve 162 to shift. Shifting of the valve 162 causes exhaust of pressure at port 4 of the arbor motor stop cylinder valve 158 which allows the spring in the valve to shift the valve 158.

Shifting of the valve 158 causes exhaust of pressure at the arbor motor 148 causing the motor to stop turning; exhaust of pressure on the other side of the stop cylinder shuttle valve 164; and pressure at retract side of the stop cylinder 150. These two latter events cause the nonillustrated stop block attached to the stop cylinder 150 to retract and pull the arbor shaft 146 out of the closure newly formed in the end of the casing strand.

At this time the cam of the shirring machine 20 which actuates the system mode pilot switch 70 moves the switch to the off position, and this causes exhaust of the pressure at port 4 of the system mode pilot valve 172. Pressure at port 4 of the valve 172 causes the valve to shift with this causing exhaust of house pressure at the gripper cylinder shuttle valve 184, house pressure at retract side of the closer approach cylinder 88, pressure at port 6 of the closer approach valve 182, house pressure at port 6 of the closer approach delay valve 176, and house pressure at port 4 of the mandrel approach valve 174. This results in a reduced pressure to the retract side of the gripper cylinder 128 to the low pressure regulated by the grip pressure regulator 186 which results in the closed strand now to be held loosely. House pressure at the retract side of the closer approach cylinder 88 causes the cylinder 88 to move the closed strand away from the closer head 46 while pressure at port 6 of the valve 182 permits the cylinder 88 to be actuated.

House pressure at port 6 of the valve 176 causes the valve 176 to shift which, in turn, causes exhaust of pressure at port 4 of the closer approach valve 182 and the port 1 of the start closer pulse valve 188. Exhaust of pressure at port 4 of the valve 182 allows the valve 182 to shift under the influence of pressure at port 6 thereof, the shifting of which permits the actuation of the closer approach cylinder 88 to move the strand.

Exhaust of pressure at port 1 of the valve 188 allows the spring of the valve 188 to reset the valve for a next pulse. Pressure at port 4 of the valve 174 causes the valve 174 to shift, causing pressure at port 1 of the drop strand pulse valve 178 and in the volume cylinder 180 and pressure to the retract side of the mandrel approach cylinder 62. Pressure at the valve 178 causes a pulse of pressure at the advance side of the gripper cylinder 128 causing the clamp members 102 momentarily to open and drop the closed strand.

Pressure on the retract side of the mandrel approach cylinder 62 causes the cylinder to retract and bring the gripper assembly into position to receive a next strand. The transfer assembly is now ready to receive a next strand by repetition of the above-described operations.

At this time it is pointed out that the control circuitry also includes a manual control for applying an actuating pressure to the port 4 of the closer mode valve 160 for effecting the manual operation of the closer head 46 when so desired. However, since this manual control circuit, which is identified by the numeral 204, is not part of this invention, it is not specifically described here.

Figure 8:
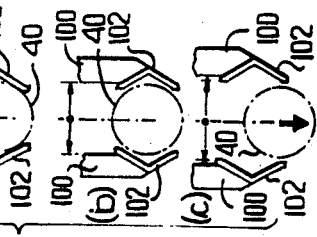
FIG. 8 is a series of schematic end views of the jaw assembly, showing the various positions of the jaws with respect to a casing strand.

It is to be understood that while a specific mechanism has been specifically illustrated and described for use in a shirring machine such as the shirring machine 20, the mechanism may be changed for use with other shirring machines and/or other closing devices without departing from the spirit and scope of the invention as defined by the appended claims. It is to be understood that the essential features of the invention include means to receive strands of varying sizes. To this end, it is pointed out that with reference to FIG. 8, basically the illustrated strand of the largest diameter strand for which the apparatus is designed. However, if smaller diameter strands are to be handled, then it is necessary to increase the pressure directed to the gripper cylinder 128 by controlling the pressure of air supplied by the pressure regulator 192. It will be apparent that by increasing the pressure supplied by the regulator 192 the springs 98 will be further compressed and thus reduce the size of the opening defined by the clamp members 102 as shown in FIG. 8b.

Another essential feature is the provision of a means to grip the strand sufficiently tight to prevent rotation or axial movement of the strand during the closing operation. This is controlled by the air pressure directed to the gripper cylinder 128 through the system mode valve 172 and the shuttle valve 184.

Another feature of the invention is to provide a means to transport the strand to the closing device and a means to press the end of the strand against the closing device with correct pressure to produce a suitable closure. With respect to this, it is to be noted that the closer approach cylinder 88 has in series therewith a needle valve 168 which controls the rate of fluid directed thereto and thus controls the rate of operation. The needle valve 194 serves the same function with respect to the mandrel approach cylinder 62.

The invention should also include a means to start the closing operation while the strand is maintained in contact with the closing device as well as means for transporting the closed strand from the closing device, together with means for dropping the closed strand. In the illustrated embodiment of the invention these are all effected by the gripper cylinder 128 and the closer approach cylinder 88.

The final essential features of the invention are means for resetting the gripping means to the correct size to receive the next strand and a means for transporting the gripping means back to the correct position to receive the next strand. While in accordance with this invention the gripper cylinder 128 in association with the springs 98 perform this first function, other means may be provided and while the transportation of the gripper means back to the starting position is effected by the mandrel approach cylinder 62, other types of positioning means may be provided.

I claim:

1. A method of handling a strand of shirred food casing with a device comprising a strand gripper, first and second carrier means for the strand gripper, said first and second carrier means being integral with one another, the second carrier means being movable relative to the first carrier means, said strand gripper being mounted on the second carrier means and comprises a pair of axially elongated jaws, said strand handler including first drive means for moving the first and second carrier means and the strand gripper in a first direction, and a second drive means for moving the second carrier means and strand handler in a second direction, which method comprises the steps of spacing the axially elongated jaws of the strand gripper sufficiently to form a strand receptacle, doffing the strand from a shirring mandrel into said receptacle, moving the jaws together to grip the strand, aligning the jaws and a terminal end of the strand with an end closure mechanism, forming an end closure at the terminal end of the strand, and thereafter opening the jaws of the strand gripper sufficiently to release the strand.

2. A strand handler for receiving and moving a shirred casing, which comprises a strand gripper, first and second carrier means for the strand gripper, said first and second carrier means being integral with one another, the second carrier means being movable relative to the first carrier means, said strand gripper being mounted on the second carrier means, said strand handler including first drive means for moving the first and second carrier means and the strand gripper in a first direction, and a second drive means for moving the second carrier means and the strand gripper in a second direction.

3. The strand handler of claim 2 wherein the strand gripper comprises a pair of axially elongated jaws.

4. The strand handler of claim 3 wherein the strand gripper inlcudes means for moving the jaws together in a plane to grip a strand positoned therein.

5. The strand handler of claim 3 wherein the stand gripper jaws define in an open strand receptacle.

6. The strand handler of claim 3 wherein the drive means for the first and second carriers are fluid cylinders.

7. A strand handler for receiving and moving a shirred strand from a shirring station, which comprises a strand gripper, first and second carrier means for the strand gripper, said first and second carrier means being integral with one another, the second carrier means being movable relative to the first carrier means, said strand gripper being mounted on the second carrier means and comprises a pair of axially elongated jaws, said strand handler including first drive means for moving the first and second carrier means and the strand gripper in a first direction, and a second drive means for moving the second carrier means and strand handler in a second direction.

8. The strand handler of claim 7 wherein the first and second drive means comprises fluid cylinders.

9. The strand handler of claim 8 wherein the fluid cylinder is a pneumatic cylinder and includes means for varying the air supplied thereto.

10. The strand handler of claim 8 wherein the first drive means transfers the first and second carrier and the strand handler in a direction transversely to the shirring station and the second drive means transfers the second carrier and strand handler axially towards an end closing mechanism.

* * * * *